United States Patent
Abbate (10) Patent No.: US 7,277,576 B2
(45) Date of Patent: Oct. 2, 2007

(54) ACTIVE COLOR CORRECTION TO COMPENSATE FOR NEAR FIELD COLOR CAST

(75) Inventor: Jeffrey Allan Abbate, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 10/447,247

(22) Filed: May 28, 2003

(65) Prior Publication Data

US 2004/0240732 A1    Dec. 2, 2004

(51) Int. Cl.
G06K 9/00 (2006.01)
G06K 9/40 (2006.01)
G06K 9/46 (2006.01)
G06K 9/66 (2006.01)
G03F 3/08 (2006.01)

(52) U.S. Cl. ............... 382/167; 382/194; 382/274; 358/518

(58) Field of Classification Search ............ 382/167, 382/254, 271, 162, 190, 194, 274; 345/589; 356/405; 358/518–523; 348/251, 254
See application file for complete search history.

(56) References Cited

U.S. PATENT DOCUMENTS 5,771,312 A    6/1998 Spitzer
7,015,955 B2 *  3/2006 Funston et al. .......... 348/223.1
2004/0140973 A1 *  7/2004 Zanaty ................. 345/214
2004/0183923 A1 *  9/2004 Dalrymple ............ 348/224.1

OTHER PUBLICATIONS

Cooper et al. ("A Novel Approach to Color Cast Detection and Removal in Digital Images," IS&T/SPIE Conf. Color Imaging: Device-independent Color, Color Hardcopy, and Graphic Arts V, Jan. 2000, pp. 167-177).*

* cited by examiner

Primary Examiner—Matthew C. Bella
Assistant Examiner—Yubin Hung
(74) Attorney, Agent, or Firm—Marshall Gerstein & Borun LLP

(57) ABSTRACT

A system includes a video display device and an image capture device, such as a miniature camera. The system corrects a real-time video image of an object within a near field region of the video display device, if that display device is displaying a primary image that alters the appearance of the near-field object. Displaying primary images having high red, blue, or green content may alter the appearance of the object to the capturing device. The system accesses the primary image to be displayed on the display device and derives an image characteristic for that image. The image characteristic may be compared to threshold values to derive a color correction score. The color correction score may be used to derive a correction color for the pixels in the real-time image of the object. These correction color pixels are used to reconstruct that image of the object, thereby removing the color alteration that resulted from the display of the primary image on the display device. The system may be a computer system, a personal data assistant, a cellular telephone, or other devices.

19 Claims, 9 Drawing Sheets

| BIT # | COLOR | CORRECT COLOR1 | | CORRECT COLOR2 | | CORRECT COLOR3 |
|---|---|---|---|---|---|---|
| 34 | RED1 | RED CORRECT1 | | RED1 | | RED CORRECT3 |
| | | | | | | |
| | | | | | | |
| | | | | | | |
| | | | | | | |
| | | | | | | |
| 203 | BLUE1 | | BLUE1 | BLUE CORRECT1 | | BLUE2 |
| 204 | BLUE2 | | | | | |

ACTIVE COLOR CORRECTION TO COMPENSATE FOR NEAR FIELD COLOR CAST

FIELD OF THE DISCLOSURE

The present invention relates to the display of a video image and, more particularly, to the correction or alteration of a video image to be displayed.

BACKGROUND OF THE PRIOR ART

Increasingly, cameras are being used with computer and other electronic devices to record digital and analog images. For example, small mountable cameras, typically referred to as web-cams, are used with computers to capture still and video images that may be sent across a computer network. More recently, miniature cameras have been incorporated into cellular telephones and personal data assistants (PDAs) to store images that may be transmitted through wired and wireless techniques. In all these examples, the cameras offer the advantage of compactness and portability.

Unfortunately, the small size of these cameras translates into relatively low resolution and limited focus range. As a result of these limitations, such miniature cameras are used primarily in the image capture of objects that are relatively close to the camera. The web-cam, for example, is used mainly to capture images of a user at the computer and not to capture images of objects a substantial distance away from the camera.

While these cameras offer relatively good picture quality on these close-up images, they are nonetheless susceptible to imaging errors. One of the biggest imaging problems is attributable to the closeness of the objects being imaged. Objects that are close to the camera are typically close to the device with which the camera is being used. Cameras imbedded in a PDA, for example, capture images of objects in close proximity to the PDA screen. Cameras used as web-cams often capture images of objects that are close to both the camera and the computer monitor. Such objects are considered near-field objects.

If the PDA screen or the computer monitor is displaying an image of a sufficient brightness, in comparison to the ambient light, then a near-field object may have a distorted appearance depending on the color of that image being displayed. A computer operator sitting in front of a monitor displaying a bright red picture may appear to have an unnatural, pinkish tint to their skin tone. This is a result of the user being in the near field of the monitor and reflecting the red light produced by that monitor. The problem is particularly noticeable with white portions of an image. The "whites" will appear "off-white" to a camera. The problem is termed a color cast problem and is exacerbated when the computer, PDA, or other device is being used in a dark environment without ambient light. Here the light from the device is the only light illuminating the object, whose image is to be captured by the camera.

DETAILED DESCRIPTION

Numerous example techniques are described for compensating for color casts affecting the appearance of a near field object. Although the techniques are described with respect to the display of color-altering content on a video display device and correcting a real-time or live image affected by that display, the techniques may be used in any number of environments. The color cast may be from video monitors, LCD screens, or other image sources. Further, the techniques may be used for color enhancement and manipulation in addition to color correction.

Figure 1:
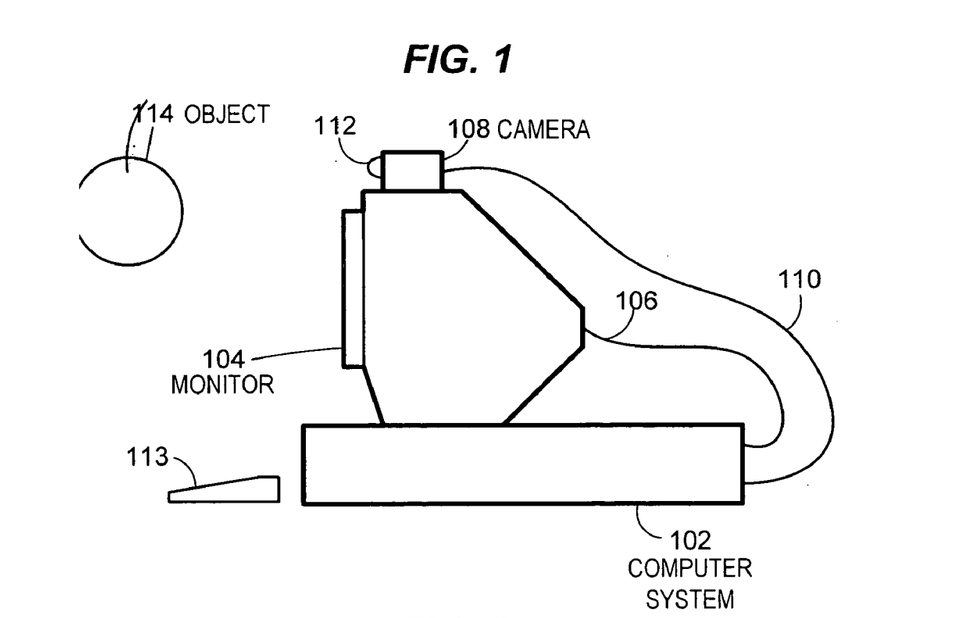
FIG. 1 illustrates a system, including a computer, monitor, and camera that reproduces an image of an object; the system implements an example color correction process.

FIG. 1 illustrates a system 100 that may be used as an active color correcting system to compensate for near field color distortion of an object. The color distortion may be caused by a video monitor or other light source illuminating the object. Such sources in the near field may greatly alter the appearance of the object to a camera or other image capturing device.

In the illustrated example, the system 100 includes a computer system 102 connected to a monitor 104 via a video connection 106, such as connector having a D-15 pin, a USB, BNC, or digital video interface (DVI) connector. Analog connections like an S-video, RCA, or component video connector may also be used. The monitor 104 displays video data provided to it by the computer system 102. Video graphics array modes VGA, SVGA, XVGA, and UXGA are example resolution formats for such video data. Numerous video data formats are known. Examples include compressed formats such as the motion pictures expert group (MPEG), Windows Media™ (AVI), and Quicktime® (MOV) formats. Of course, the monitor 104 may display still images as well, including non-compressed and compressed image formats. Examples include bit map (BMP), tag image file format (TIFF), graphic interchange format (GIF), portable pixmap (PPM), portable bitmap (PBM), joint photo-graphic experts group file interchange format (JFIF), and JPEG. Other still image and video formats are also known.

The system 100 includes a camera 108 connected to the computer system 102 via a connection 110. The camera 108 may be any type of image capturing device including cameras popularly termed web cam devices, examples of which include personal computer (PC) cameras. Example cameras may provide video and/or still images in the formats listed above. The camera 108 has a lens 112 facing an object 114. The object 114 is positioned in front of the camera 108 and may represent a human operating the computer system 102, for example. A keyboard 113 is also shown.

Figure 2:
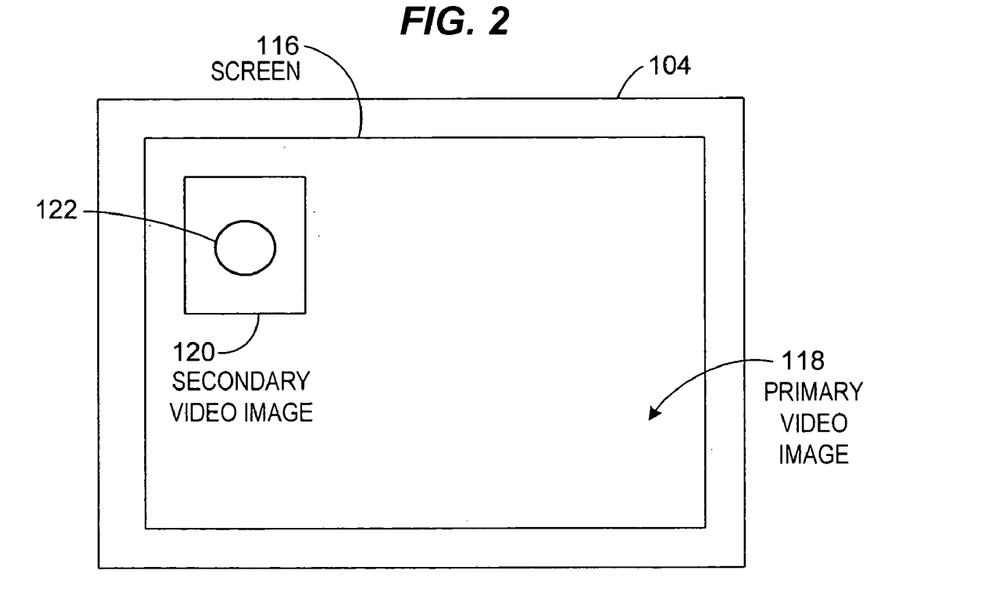
FIG. 2 is a front view of the monitor of FIG. 1 showing a primary video image and a secondary video image.

During operation of the computer system 102, various images may be displayed on a screen 116 (FIG. 2) of the monitor 104. FIG. 2 shows an example display on the screen 116, showing a primary video image 118 and a secondary video image 120, having a recorded video image from the camera 108. The secondary video image 120 contains a rendition 122 of the object 114. In the illustrated example, the primary video image 118 dominates the screen 116 and may cast a particular color or set of colors onto the object 114. This projection may affect how the object 114 appears as it is captured by the camera 108. If, for example, a predominantly blue image is being displayed as the primary video image 118, then the object 114 may have a blue tint recorded by the camera 108 which means that rendition 122 would have a blue tint. This near field alteration occurs frequently when the object 114 is a user sitting close to a display monitor.

Although the system 100 is generally shown as being a personal computer, the system 100 may be any machine capable of executing instructions stored on a machine-accessible medium, such a data processing device, computer, PDA, cellular telephone, image processor or other individual or networked devices. The machine-accessible medium may be a storage device, storage medium, or the like. By way of example, the machine-accessible mediums may include a volatile or non-volatile memory, random access memory (RAM), flash memory, read-only memory (ROM), a compact disc read-only memory (CD-ROM), a floppy disk, a mass storage drive, or a digital video disc read-only memory (DVD-ROM).

Figure 3:
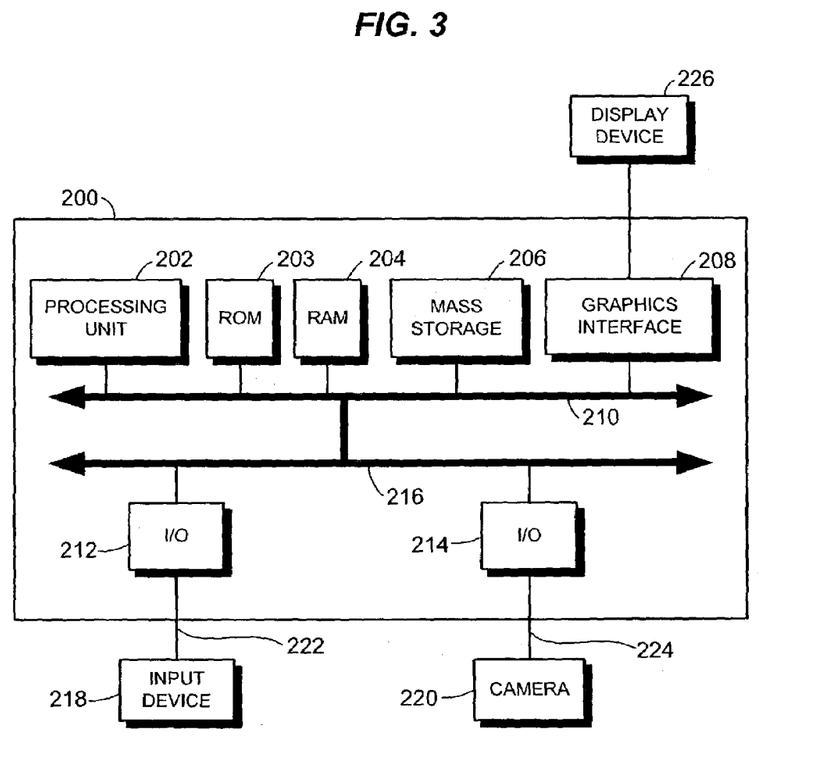
FIG. 3 is a detailed block diagram of a system that may be used in the system of FIG. 1.

FIG. 3 illustrates a block diagram of a system 200 that may be used in the system 100. The system 200 includes a processing unit 202, a ROM block 203, a RAM block 204, a mass storage block 206 (e.g., a tape drive, magnetic disk drive or optical disk drive, in read or read/write formats), and a graphics interface block 208, each connected to a local bus 210. The processing unit 202 may be a central processing unit (CPU). It may also represent a multiprocessor device. The processing unit 202 may include a microprocessor such as any of the Intel® family of microprocessors including Celeron®, Pentium®, Xeon™, Itanium®, and Centrino™ based microprocessors. The unit 202 may be a single- or a dual-processor unit.

The system 200 includes two input/output (I/O) interface blocks 212 and 214, each connected to a system bus 216 connected to the local bus 210. Alternatively, the system bus 216 and local bus 210 may be a single bus or replaced with other known bus layouts. The I/O block 212 is connected to an input device 218 (e.g., a keyboard or keypad) and the I/O block 214 is connected to a camera 220. The I/O interface devices 212 and 214 may be Institute of Electrical and Electronics Engineers (IEEE) 1394 interfaces, commonly known as Firewire™ interfaces, universal serial bus (USB) interfaces, USB 2.0 interfaces, serial interfaces, parallel port interfaces, DVI (digital video interface) interfaces, D-15 pin connectors, BNC connectors, S-video connectors, RCA connectors, or component video connectors, for example. While hard-links 222 and 224 are shown, it will be appreciated by persons of ordinary skill in the art that wireless connections to the I/O interface devices 212, 214 may be used. For example, the I/O interface device 212 may have an RF or optical transceiver or receiver communicating to a corresponding transceiver or transmitter connected to the input device 218.

The graphics interface block 208 includes a graphics video card and is connected to a display device 226, such as a video display monitor, television, LCD screen, or the like. The graphics interface block 208 may be coupled to a chipset (not shown) in the system 200, such as a chipset provided by Intel Corporation including the family of 810, 815, 845, or 850 chipsets. The 816 and 815 family of chipsets are primarily used for Pentium® III and Celeron® processors, while the 845 and 850 families are optimized for Pentium® IV operation and faster systems.

Although the system 200 is generally described in the context of a computer system like the system 102, alternatively, the system 200 may be part of a PDA, cellular telephone, other portable device, or any of the machines described above.

Figure 4:
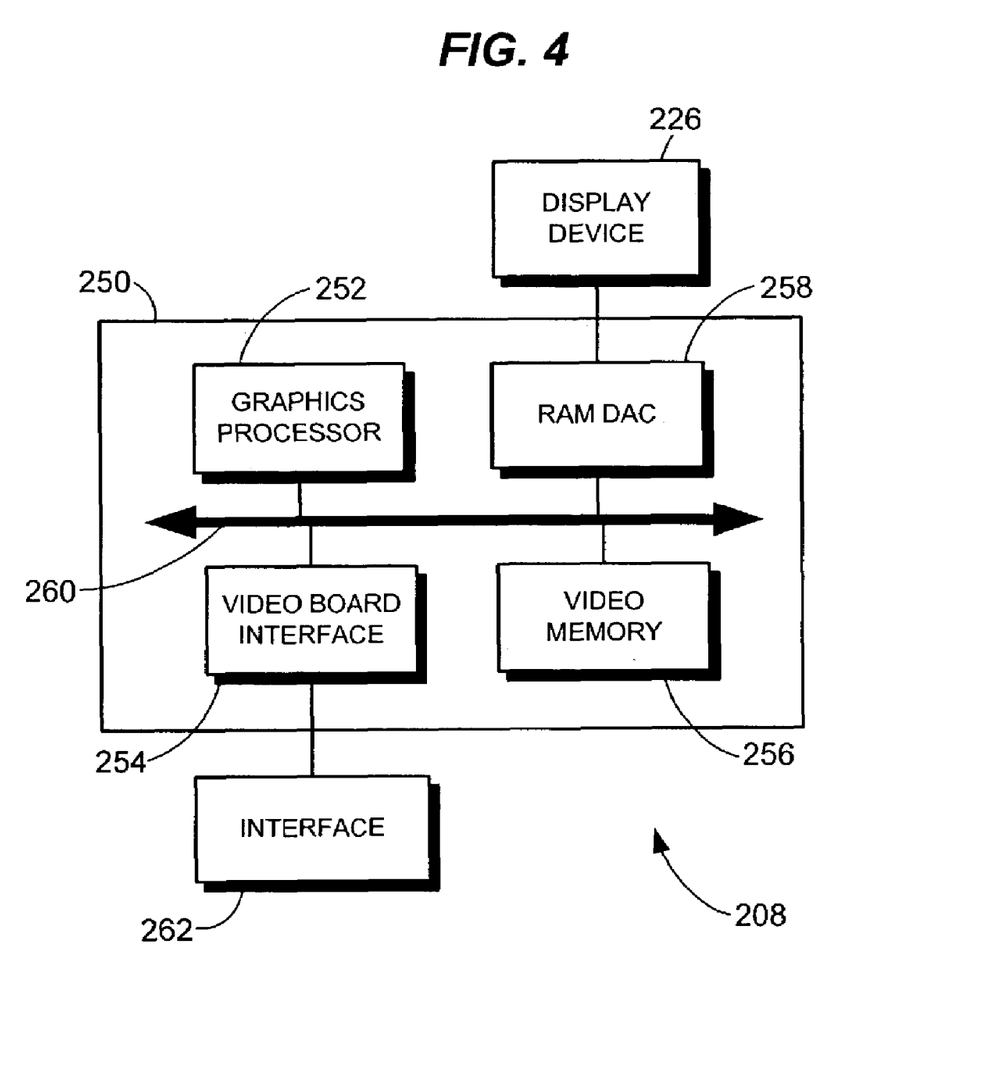
FIG. 4 illustrates a block diagram of an example video graphics processor board that may be used in the computer system of FIG. 3.

FIG. 4 illustrates an example, detailed block diagram of the graphics interface 208. The interface 208 comprises an integrated video circuit board (i.e., a video graphics card) 250 that is mounted in the system 200. The board 250 includes a graphics processor 252, a video board interface 254, a video memory 256, and a RAM DAC (digital-to-analog converter) 258, all shown, for example purposes, coupled to a circuit board bus 260. The bus 260 may represent multiple buses or individual connections between any of the blocks shown. The video board interface 254 on the circuit board 250 connects to a motherboard interface 262 that may also be part of the overall graphics interface 208. The interfaces 254 and 260 may be PCI (peripheral control interconnect) or AGP (advanced graphics processor) interfaces, for example.

In operation, image data to be displayed on the monitor 104, e.g., a primary video image data to be displayed as the image 118, is received through the interfaces 262 and 254. The image data is processed by block 252 and may be stored in the video memory 256 before being converted from a digital format to an analog format by the RAM DAC 258 for display on the display device 226.

Figure 5:
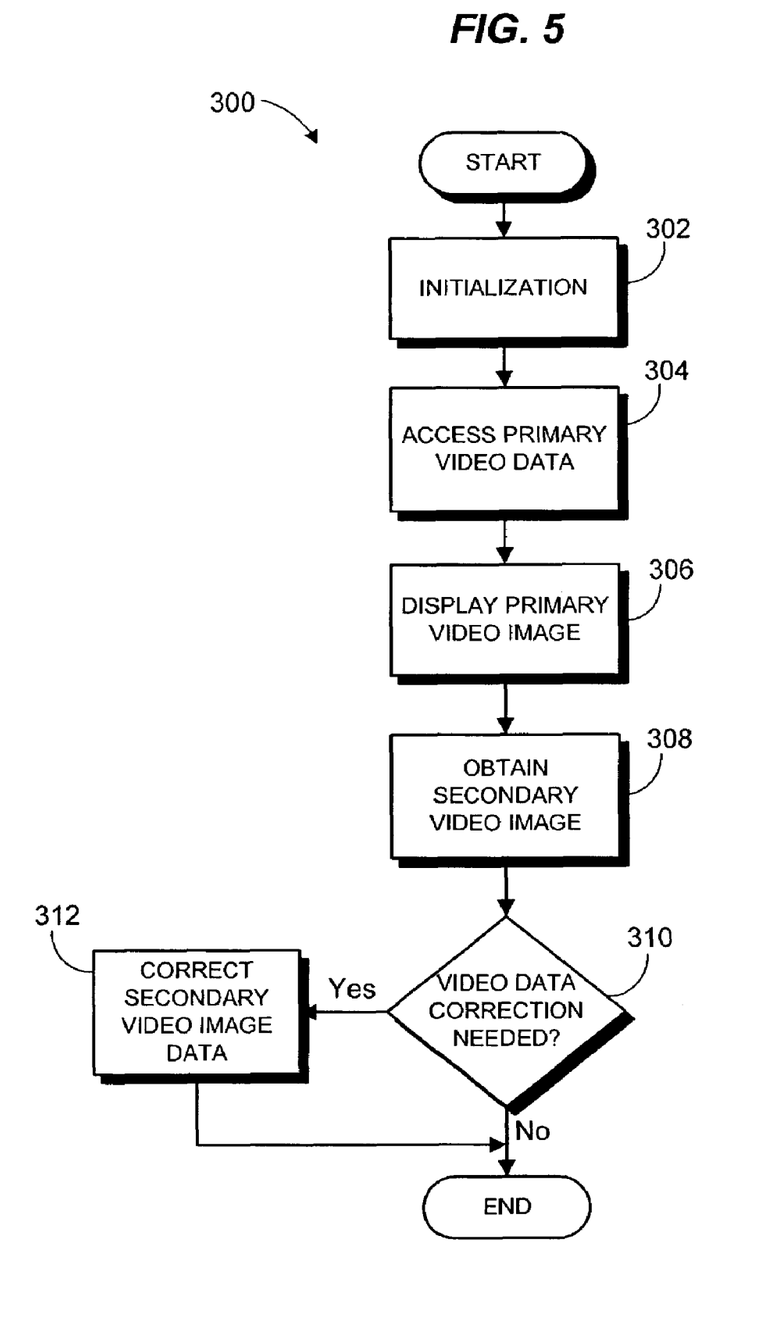
FIG. 5 illustrates an example process for correcting the color of an image received from a camera.

FIG. 5 illustrates an example process 300 for correcting video image data received by a camera or other image capturing device. The process 300 may be implemented by software stored and executed by the system 200. In the illustrated example, the process 300 executes various software routines or steps described by reference to blocks 302-312.

A block 302 performs an initialization that may reset process variables and memory storage. Alternatively, the block 302 may also perform a calibration, such as a calibration process 800 illustrated in FIG. 11.

A block 304 accesses a primary video image data. This data is generated by software routines executed by the system 200 and is provided to the graphics card 250, which displays the image data as the primary video image 118. The block 304 may access the image data from memory such as the memory 204, or it may access the image data stored in a memory on the graphics card 250, for example, the dedicated video memory 256. The image data may be in a video or still image format, such as those mentioned hereinabove.

After the image data is accessed by block 304, block 306 displays that video data as the primary video image 118. A block 308 then obtains a secondary video image (either a still image or a video image) received by the camera 108. In an example, the secondary video image is a real-time or live video image of the object in front of the camera 108. The block 308 may obtain the image data from a video memory within the camera 108 or any memory within the system 200 used to store the secondary video image. This memory may be a RAM or flash memory, for example.

After the block 308 receives the secondary video image, a block 310 determines whether any video data correction is needed on the secondary video image. The block 310, for example, may analyze the primary video image data to determine, based on the colors of that image, whether any near field color cast from the monitor 104 is likely to alter the appearance of the object 114. If block 310 determines that no video data correction is needed, then the process ends. If it is determined that video data correction is needed, then the block 310 passes control to a block 312 where the secondary video image is corrected, and the process 300 ends. Although the process 300 is shown in a particular order, the order of the illustrated blocks may be different than that shown. Furthermore, the blocks shown may be executed simultaneously, in a parallel manner. For example, the blocks 304 and 306 may be combined and the combined block may be executed in parallel with block 308, where both the block 308 and the combined block would provide an input to the block 310.

Figure 6:
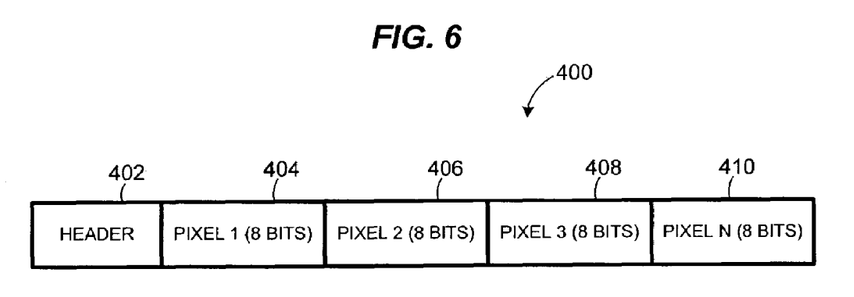
FIG. 6 illustrates a data block for a video image to be displayed or received, showing multiple pixel data blocks each 8 bits in length.

FIG. 6 illustrates an example data block 400 for a primary video image that is to be displayed or secondary video image received from a camera. The data block 400 may represent a frame of a video data or a still image data in a bitmap format, for example. The data block 400 includes a header block 402, which may include a file name, image resolution, bits per pixel, and image compression data. If the block 400 represents a single frame of a video stream, the header block 402 may include video compression data and the frame name and number.

Following the header block 402 is a series of data blocks, one for each pixel in the video image. Block 404 is an 8 bit block representing the display data for pixel 1. Blocks 406, 408, and 410 represent display data for pixel 2 through pixel n, respectively, each being 8 bits wide. The 8 bit data value defines the color of the pixel. For explanation purposes, the illustrated examples will be described with reference to pixels having a color formed of red, green, and blue colors. Red, green, and blue may be used to describe all of the pixels that may be displayed by the system 200 and, as such, are complimentary colors. Within each of these three color groups, hue, saturation, and luminescence may further define the specific colors forming that color group. Other complimentary color groups may be used, such as the group containing cyan, yellow, magenta, and black (CYMK) used in the print industry.

There are 8 bits per pixel in the data block 400, which means that 256 colors may be displayed at one time. Eight bits are used by way of example. Any number of bits per pixel may be used.

Figure 7:
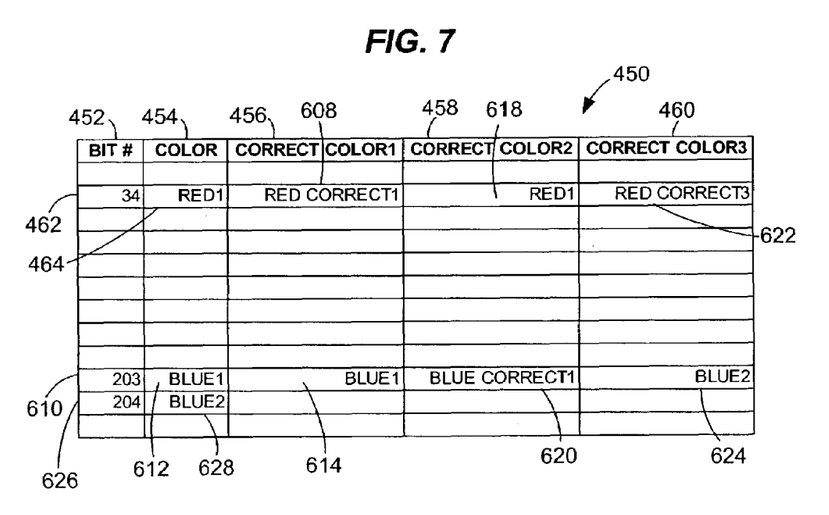
FIG. 7 illustrates a color look-up table that may be accessed by the system of FIG. 3.

Although only 256 colors may be stored in the video data block 400, these colors may be chosen from a much larger palette of colors, using known palette-indexing techniques. FIG. 7 illustrates an example color look-up table (CLUT) 450 that may be stored within the system 200. In the illustrated example, the CLUT 450 includes a Bit # column 452, a Color column 454, a Correct(ion) Color1 column 456, a Correct Color2 column 458 and a Correct Color3 column 460. The CLUT 450 may be used to set the color of each pixel by finding the row that corresponds to the particular 8 bit value stored at the pixel block and deriving the color value stored in the column 454 intersecting that row. The CLUT 450 may be stored in memory in the graphics video card 250, for example.

In the illustrated example, block 462 stores the 8 bit number "34" and block 464 stores the corresponding color "RED1," which may be read by the system 200 and displayed on the display device 226. In the illustrated example, each row of the CLUT 450 may represent a different color and, as such, the CLUT 450 may store many more colors than the 256 available for display using the 8 bits per pixel data block. The CLUT 450 will be described further below.

Figure 8:
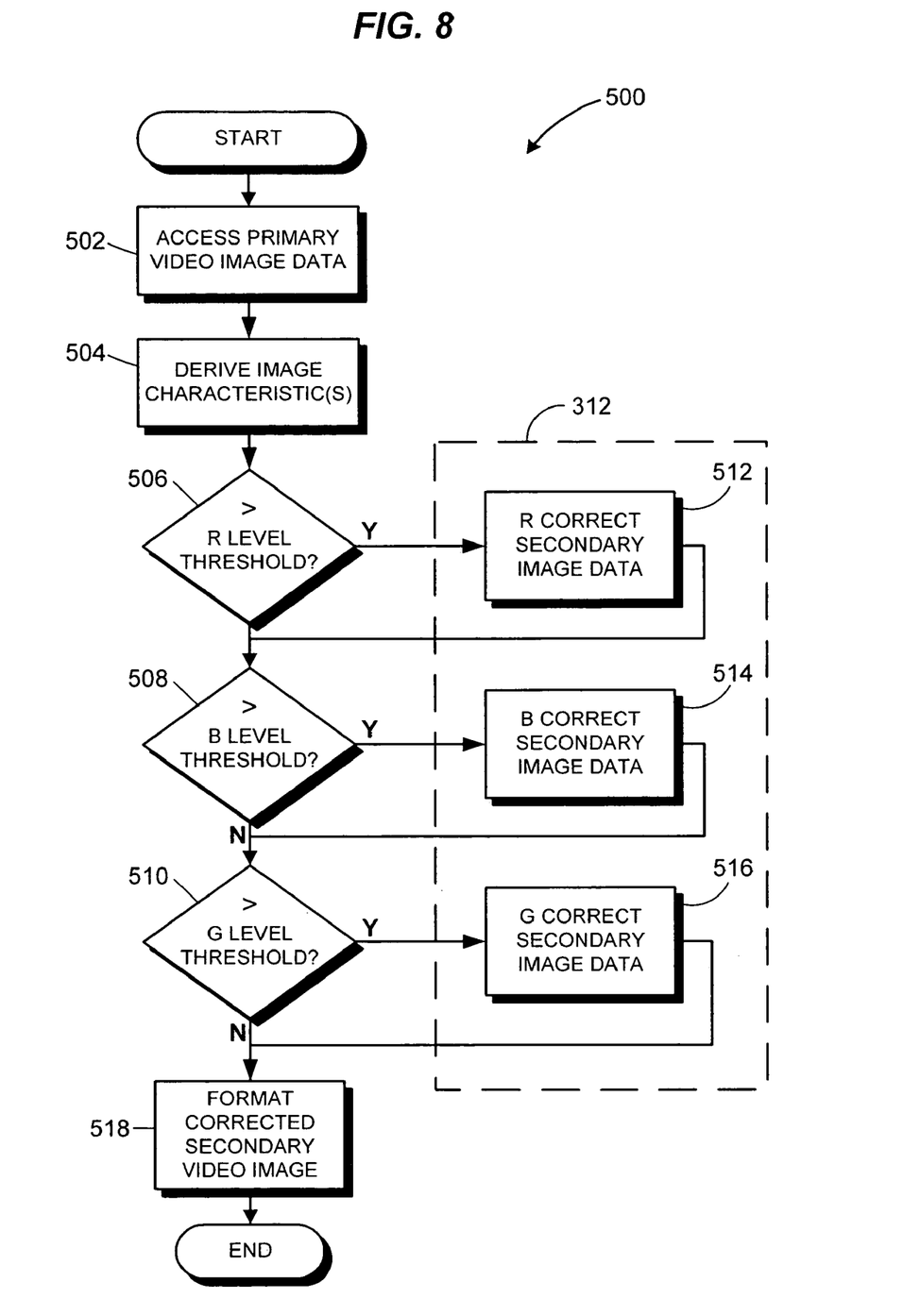
FIG. 8 illustrates a block diagram of an example process for correcting a secondary video image, whose appearance may have-been altered by an excess color displayed as a primary video image by a video display device.

The FIG. 8 illustrates an example process 500 for correcting video data. The process 500 may be implemented by software stored and executed by the system 200. In the illustrated example, the process 500 executes various software routines or steps described by reference to blocks 502-518.

The process 500 includes a block 502 that accesses the primary video image data the data 400 stored in the RAM 204, storage 206, or the graphics interface 208. The primary video image data is data that is converted by the graphics interface 208 for display as the primary video image 118.

A block 504 derives an image characteristic, $I_{CHAR}$, for this primary video image data. The image characteristic is a quantitative representation of the primary video image data and may represent the amount of the predominant color of the primary video image data. For example, the image characteristic may represent the amount or percentage of red, green, or blue pixels to be displayed in the primary video image 118. Alternatively, the image characteristic may represent overall image intensity or other characteristics of a displayed image that may be color-altering characteristics, i.e., characteristics that may affect the appearance of an object within a near field of a display device.

In the illustrated examples, the process 500 will be described as correcting for excess red, blue, or green pixels within the primary video image data, for example purposes.

To derive the image characteristic, $I_{CHAR}$, the block 504 may determine the total amounts of red pixels, blue pixels and green pixels contained in the primary video image data and assign $I_{CHAR}$ a value equal to the largest of these pixel numbers. Various other techniques for measuring and quantifying the amount of a particular color in a video image data will be known to persons of ordinary skill in the art. Further, the block 504 may derive an image characteristic array, $\{I_1 \ldots I_N\}$, representing a red-, blue- or green-content of the primary video image data.

A block 506 accesses the image characteristic value $I_{CHAR}$ or array $\{I_1 \ldots I_N\}$ and determines if the value (array elements) is (are) above a predetermined threshold red-content level. The threshold may be a total number of pixels or a percentage of overall pixels and represents a predetermined threshold above or below which display of the image on a display device will cast a color on a near field object that alters the appearance of that object to an image capture device. A next processing block 508 determines whether the image characteristic value is above a threshold blue-content level. A processing block 510 determines whether the image characteristic is above a threshold green-content level. In the illustrated example, threshold value comparisons are done for the complementary primary colors red, green and blue, however, the processing blocks 506, 508, 510 may do threshold value determinations for other constituent colors groups or other image characteristics like intensity.

If block 506 determines that the image characteristic of the primary video image data is above a red-content threshold, then control passes to block 512. The block 512 corrects the secondary video image, obtained by the block 308, by correcting for the excessive red content in the primary video image data. The block 512 passes control to the block 508.

If the characteristic color is not above the red-content threshold, then control automatically passes to the block 508.

If the block 508 determines that the image characteristic is above a blue-content threshold value, the block 508 passes control to a block 514, which corrects for the excessive blue content in the primary video image data. The block 514 passes control to the block 510. If the block 508 determines that the color image characteristic is not above the blue-threshold value, then control passes directly to the block 510.

The block 510 passes control to a block 516 for correction of excess green-content data, if it is determined that the image characteristic of the primary video image is above a green threshold value. The blocks 510 and 516 are connected to a block 518 which further formats the corrected secondary video image data, if necessary, for display on the monitor 104. The block 512, 514, and 516 may be executed by the block 312. The blocks 512, 514, and 516 may be executed by the block 312.

As the example process 500 illustrates, with the described techniques, image correction of a secondary video image may be based on data obtained before the color casting primary image is displayed. The amount of correction may depend upon the value of the image characteristic, $I_{CHAR}$.

Figure 9:
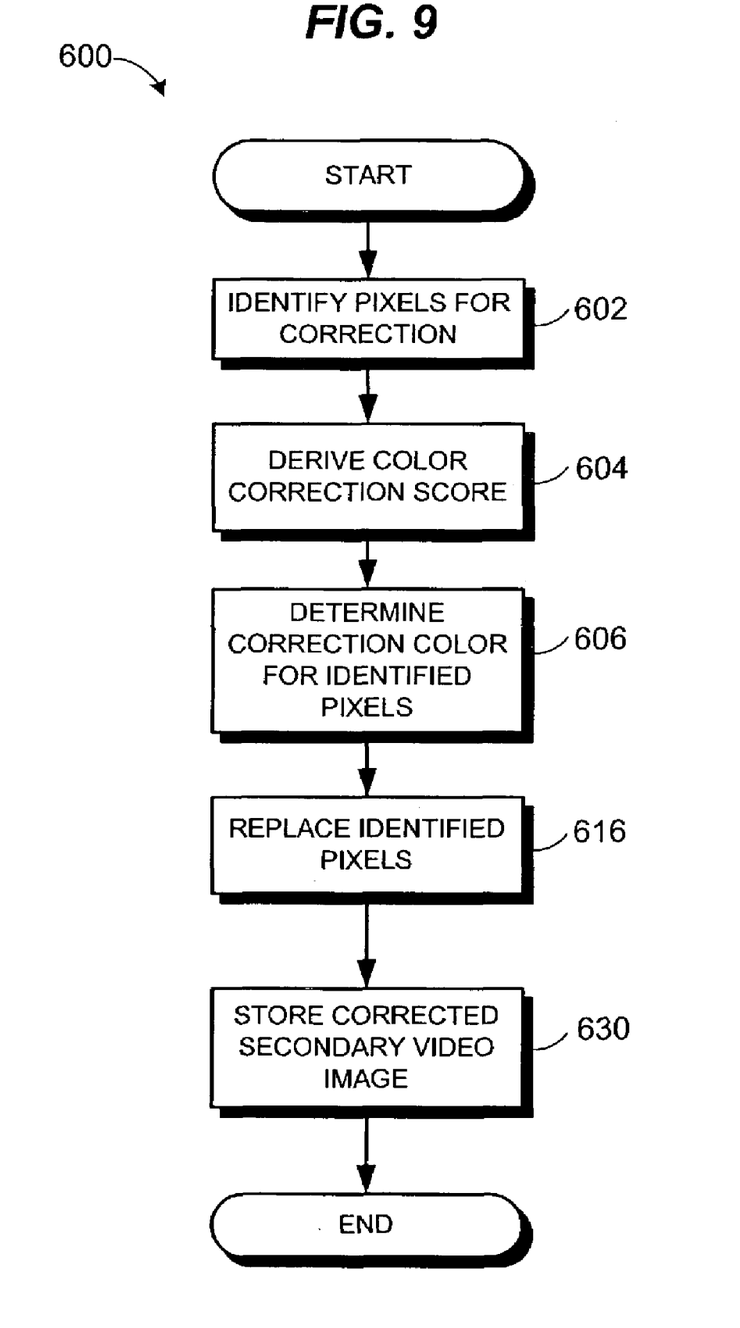
FIG. 9 illustrates a detailed block diagram of an example correction process that may be implemented by the process of FIG. 8.

FIG. 9 illustrates an example process 600 for compensating for a color cast by an image displayed on a display device. The compensation may occur when the image characteristic of the primary video image is above a threshold value, such as those identified above. The process 600, therefore, may be implemented by any of the blocks 312, 512, 514, and 516. The process 600 may be implemented by software stored and executed by the system 200. In the illustrated example, the process 600 executes various software routines or steps described by reference to blocks 602, 604, 606, 616, and 630.

A block 602 takes a secondary video image, such as a real-time image, and identifies all pixels within that image that may be affected by the excess color content of the primary video image data. If the image characteristic of the primary video image is above a red-threshold, for example, then the block 602 may flag all pixels within the secondary video image that have a color that may be altered by excess red being displayed on display device. This flag may include all pixels in a secondary image, white pixels only, low intensity pixels, pixels below a certain color saturation, or other pixel characteristics. By way of example only, the process 600 will be described correcting all pixels in a secondary video image.

Block 604 derives a color correction score representing an amount of excess color for the primary video image data, for example, by subtracting the image characteristic, $I_{CHAR}$, from a threshold value. The threshold value may be the same or different as the threshold values of blocks 506, 508, and 510, and the threshold may be different for red, blue, and green pixels. By way of example, if it has been previously determined that no more than 40% of the pixels in the primary video image data should be red in color, e.g., that $I_{CHAR}$ should be less than a 40% threshold, the color correction score will represent the difference between the threshold and the image characteristic, $I_{CHAR}$.

The color correction score may alternatively be a weighted score, for example, by not only determining the amount of color pixels above a threshold but identifying the quality of the color pixels, e.g., the hue, luminescence, and saturation of color pixels. Excess, highly-saturated red pixels may result in a higher color correction score than excess lesser saturated or lesser intensity red pixels. Such a weighted score may be derived using the CLUT 450 and determining where a particular color resides in the Bit # column 452, where the colors in that column have been order by intensity and saturation.

Block 606 uses the color correction score to determine a correction color, ColorN, for each identified pixel. For example, the block 606 may access one of the Correct ColorN columns 456-460 in the CLUT 450, where each column 456-460 corresponds to a different color correction score. Various example operations will now be described.

EXAMPLE 1

The block 606 may access the CLUT 450. The color correction score derived by block 604 represents an excess red content in the primary video image data. Correct Color1 column 456 has been previously associated with a color correction score representing such excess red content. In this example, the block 606 looks to each cell with the column 456 for a correction color for each available color pixel. For any pixel in the secondary video image having a bit number "34" (which would be stored in an 8-bit word format), a memory location 608 associated with memory location 462 stores a corrected color, RED CORRECT1. The data values in the CLUT table 450 may be predetermined.

A memory location 610 stores a bit number "203" having a color BLUE1 stored in memory location 612. For pixels of this color, the block 606 determines that the corrected color is BLUE1 stored at memory location 614, i.e., the pixel color is not to change.

After the block 606 has determined the correction color for all pixel colors, control passes to bock 616.

EXAMPLE 2

For a color correction score associated with the CORRECT COLOR2 column 458, the block 606 would access the CLUT 450 and determine that for pixels having the bit number "34" the corrected color is the original bit color, RED1, stored in memory location 618. For the bit number "203," the correction color is not identical to the original bit color, but is instead, BLUE CORRECT1, stored in memory location 620. In this example, the color correction score may represent an excess blue color in the primary video image data.

EXAMPLE 3

For a color correction score associated with the CORRECT COLOR3 column 460, the block 606 would access the CLUT 450 and determine that for pixels having the bit number "34" the corrected color is RED CORRECT3, stored in memory location 622. For the bit number "203," the correction color is not identical to the original bit color, but is instead BLUE2 (stored at memory location 624), where BLUE2 is another color stored in the CLUT 450, having a bit number "204" stored at memory location 626 and a color stored at memory location 628. The correction color may be colors within the Bit # column 452 or other colors that are displayed in by the system 100.

The CLUT 450 is provided by way of example. Additional columns may be used in the CLUT 450, for example to allow for multiple color correction scores for each of the different colors red, blue, and green.

Returning to FIG. 9, the block 616 replaces all pixels from the secondary video image with the corrected pixels identified by the block 606. Block 630 stores the secondary video image for display on the display device 226 or monitor 104.

Figure 10:
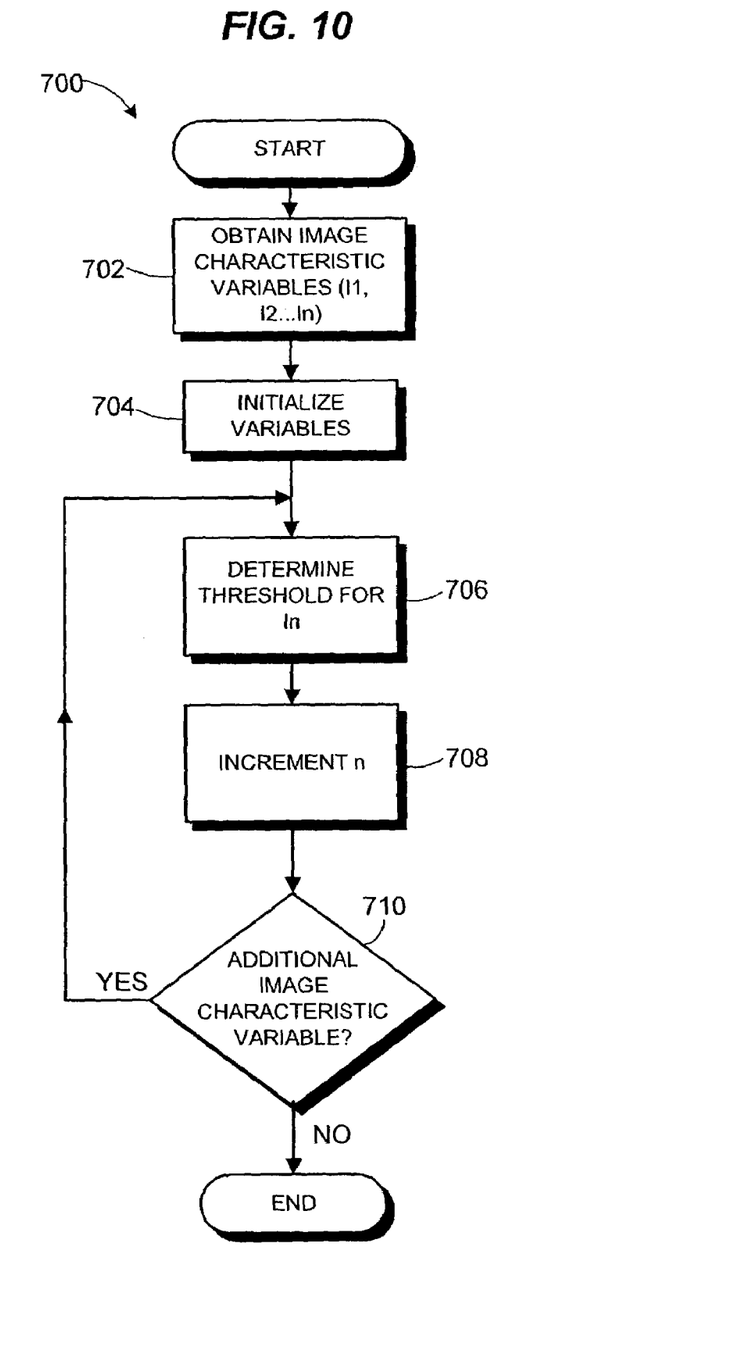
FIG. 10 illustrates a block diagram of a process for calibrating the system such as that of FIG. 1.

FIG. 10 illustrates an example calibration process 700 that may be used with the system 200. The process 700 may be implemented by software stored and executed by the system 200. In the illustrated example, the process 700 executes various software routines or steps described by reference to blocks 702-710.

Block 702 obtains all of the possible image characteristic variables that may be corrected for, for example, red-content threshold ($I_{RED}$), blue-content threshold ($I_{BLUE}$), and/or green-content threshold ($I_{GREEN}$), stored as the variables $I_1$, $I_2$, $I_3$ in a data file. Other image characteristic variables, such as an intensity variable, $I_{INTENSITY}$, may also be obtained by the block 702. With the total number of measurable image characteristic variables identified, a block 704 initializes values (i.e., thresholds) stored for each variable to a null value. The block 704 also sets an increment counter n to "1" value. Block 706 determines a threshold value for the first characteristic color threshold variable, $I_N=I_1$. Block 708 then increments n to n+1, and block 710 determines if another characteristic color threshold variable exists, at $I_{n+1}=I_2$. As stated above, if one does exist, block 708 passes control back to the block 706 which determines a threshold value for $I_{n+1}$. When no further image characteristic variables exist, the process 700 stops.

Figure 11:
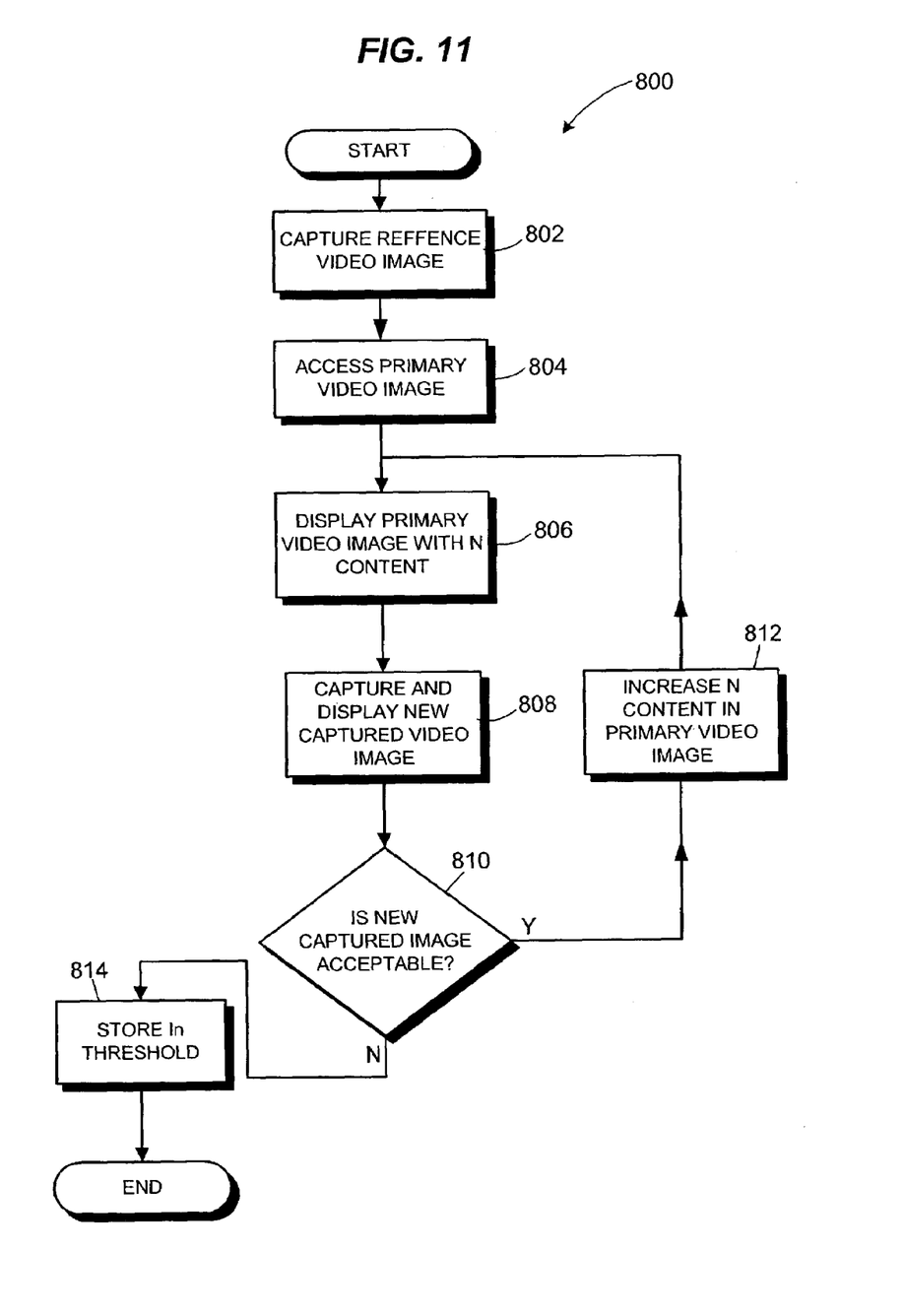
FIG. 11 illustrates a detailed block diagram of a programming routine performed by the process illustrated in FIG. 10.

FIG. 11 illustrates a sample process 800 that may be implemented by block 706. The process 800 may be implemented by software stored and executed by the system 200. In the illustrated example, the process 800 executes various software routines or steps described by reference to blocks 802-814.

Block 802 captures a reference secondary video image of the object 114 before the primary video image 118 has been displayed on the monitor 104. Block 804 then accesses a stored, primary video image data for display as the primary video image 118. The image data contains pixels with an N-content only, where N is set by the process 700. For example, if N=1 and that represents a determination of the red threshold for an image characteristic, then the block 804 accesses a first stored image data or file that contains only red pixels. The first stored image data has a first image characteristic. The storage 206 of system 200 may store numerous image files each with different image characteristics.

Block 806 displays the image data as the primary image 118. Block 808 captures and displays a new secondary video image of the object 114, said image being potentially altered in appearance by color cast from the monitor 104 displaying the primary video image 118. The new image may be displayed as the rendition 122 of FIG. 2, for example. Block 810 determines whether the new secondary image being displayed is acceptable. If the image is acceptable, the block 810 passes control to block 812, which increases the N-content within the primary video image data accessed by the block 804, and that increased-content image is displayed by the block 806. For example, for an N=1, i.e., a red-content threshold determination, the block 812 might increase the red saturation, hue, or luminance of the image data or increase the total number of red pixels in the primary video image data. Alternatively, the block 812 may access a second stored image data or file that has a greater amount of red content than the first stored image data accessed by block 804. In either case, the block 812 provides a second primary video image data having a higher image characteristic than the previously displayed image data.

The block 810 may automatically determine if the new captured image is acceptable, for example by executing programming to poll an operator to indicate whether the new secondary video image is acceptable. For example, the block 810 may poll a user through a pop-up dialog box being displayed on the monitor, and the user may indicate acceptability via a keyboard. Techniques for providing a pop-up dialog box and receiving a user input will be known to persons of ordinary skill in the art. The operator may be polled after the separate display of a red screen, a blue screen, and a green screen.

The processing of the blocks 806-812 is repeated until the new secondary video image is identified as unacceptable, at which point a block 814 stores an $I_N$ characteristic threshold that represents the amount of color content in the primary video image resulting in that unacceptable color cast on the secondary video image. The process 800 is repeated for each color that may be corrected for under the control of the block 706. The thresholds may be used by blocks 512, 514, and 516, described above.

The process 800 is described as setting a threshold value. Alternatively, the process may be used to set a threshold range having a minimum threshold image characteristic value and maximum threshold image characteristic value. Also, the process 800 may be altered to measure multiple threshold values for a given color to create multiple image characteristic thresholds for each complimentary color.

Numerous processes are described above. Although the illustrated examples are described in a particular order, they are not so limited. Each process may be implemented with the same or similar executions performed in different orders, including for example those where various executions are performed in parallel to one another. Furthermore, additional steps may be included. Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalence.

What is claimed is:

1. A method for correcting a color cast from a video display device onto an object, the method comprising:

accessing a primary video image to be displayed on the video display, wherein the primary video image does not contain the object;

analyzing the primary video image to determine if the primary video image has a content that can alter the color appearance of the object;

displaying the primary video image on the display to cast at least one color on the object;

capturing a secondary video image of the object having the color cast; and in response to the analysis, correcting the secondary video image of the object with the color cast.

2. The method of claim 1, further comprising:

deriving at least one image characteristic for the primary video image; and in response to a comparison of the at least one image characteristic to at least one predetermined threshold value, correcting the secondary video image.

3. The method of claim 2, further comprising deriving at least one color correction score that represents the difference between the at least one image characteristic and the at least one threshold value.

4. The method of claim 3, wherein the secondary video image comprises a plurality of pixels, each having one of a plurality of first colors, the method further comprising:

deriving a corrected color for at least one of the plurality of pixels, where the corrected color varies with the color correction score.

5. The method of claim 4, wherein deriving a corrected color comprises accessing a color look-up table having at least one corrected pixel color associated with the color correction score.

6. The method of claim 5, further comprising:

identifying a set of pixels for correction from the secondary image; and deriving a plurality of corrected colors one for each pixel of the set of pixels, where at least one of the plurality of corrected colors varies with the color correction score.

7. The method of claim 2, wherein the at least one image characteristic is a first primary color value, a second primary color value, or a third primary color value.

8. The method of claim 7, wherein the first primary color value is a red color value, the second primary color value is a blue color value, and the third primary color value is a green color value.

9. The method of claim 2, wherein the at least one image characteristic is an intensity value.

10. The method of claim 2, wherein the primary video image comprises a plurality of pixels and wherein deriving the at least one image characteristic comprises determining a number of pixels of the primary video image that have a first color-content.

11. The method of claim 1, wherein the primary video image has a first image characteristic, the method further comprising:

capturing a reference video image;

comparing the secondary video image to the reference video image to determine if the secondary video image is acceptable; and in response to the comparison of the secondary video image to the reference video image, altering the primary video image to have a second image characteristic higher than the first image characteristic and displaying the primary video image having the second image characteristic, re-capturing the secondary video image, and comparing the recaptured secondary video image to the reference video image.

12. An article of manufacture comprising a computer-readable medium having stored thereon instructions for correcting a color from a video display device cast onto an object that, when executed by a computer, cause the computer to:

access a primary video image to be displayed on the video display device, wherein the primary video image does not contain the object;

analyze the primary video image to determine if the primary video image has a content that can alter the color appearance of the object;

display the primary video image on the display to cast at least one color on the object;

capture a secondary video image of the object having the color cast; and in response to the analysis, correct the secondary video image of the object with the color cast.

13. The article of claim 12, having further instructions that, when executed by the computer, cause the computer to:

derive at least one image characteristic for the primary video image; and in response to a comparison of the at least one image characteristic to at least one predetermined threshold value, correct the secondary video image.

14. The article of claim 13, having further instructions that, when executed by the computer, cause the computer to:

derive at least one color correction score that represents the difference between the at least one image characteristic and the at least one threshold value.

15. The article of claim 14, wherein the secondary video image comprises a plurality of pixels, each having one of a plurality of first colors, the article having further instructions that, when executed by the computer, cause the computer to:

derive a corrected color for at least one of the plurality of pixels, where the corrected color varies with the color correction score.

16. The article of claim 15, having further instructions that, when executed by the computer, cause the computer to access a color look-up table having at least one corrected pixel color associated with the color correction score.

17. The article of claim 15, having further instructions that, when executed by the computer, cause the computer to:

identify a set of pixels from the secondary image; and derive a plurality of corrected colors one for each pixel of the set of pixels, where at least one of the plurality of corrected colors varies with the color correction score.

18. The article of claim 13, wherein the primary video image comprises a plurality of pixels, the article having instructions that, when executed by the computer, cause the computer to determine a number of pixels of the primary video image that have a first color-content.

19. The article of claim 12, wherein the primary video image has a first image characteristic, the article having further instructions that, when executed by the computer, cause the computer to:

capture a reference video image;

compare the secondary video image to the reference video image to determine if the secondary video image is acceptable; and in response to the comparison of the secondary video image to the reference video image, alter the primary video image to have a second image characteristic higher than the first image characteristic.

* * * * *